United States Patent [19]

Pedersen

[11] Patent Number: 4,531,199
[45] Date of Patent: Jul. 23, 1985

[54] BINARY NUMBER SUBSTITUTION MECHANISM IN A CONTROL STORE ELEMENT

[75] Inventor: Raymond J. Pedersen, Garrison, N.Y.

[73] Assignee: International Business Machines Corporation, Armonk, N.Y.

[21] Appl. No.: 541,819

[22] Filed: Oct. 13, 1983

Related U.S. Application Data

[63] Continuation of Ser. No. 269,146, Jun. 1, 1981, abandoned.

[51] Int. Cl.³ .......................... G06F 13/00; G06F 7/28
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,478,322 | 11/1969 | Evans | 364/200 |
| 3,735,363 | 5/1973 | Beers et al. | 364/200 |
| 3,800,293 | 3/1974 | Enger et al. | 364/200 |
| 3,958,227 | 5/1976 | Evans | 364/200 |
| 3,976,865 | 8/1976 | Enger | 371/67 |
| 4,008,460 | 2/1977 | Bryant et al. | 364/200 |
| 4,008,462 | 2/1977 | Kanda | 364/200 |
| 4,099,231 | 7/1978 | Kotok et al. | 364/200 |
| 4,099,256 | 7/1978 | Draper | 364/900 |
| 4,118,789 | 10/1978 | Casto et al. | 364/900 |
| 4,149,239 | 4/1979 | Jenkins et al. | 364/200 |
| 4,151,593 | 3/1979 | Jenkins et al. | 364/200 |
| 4,170,039 | 10/1979 | Beacom et al. | 364/200 |
| 4,190,897 | 2/1980 | Someshwar | 364/900 |
| 4,198,681 | 4/1980 | Furr, Jr. | 364/900 |
| 4,214,303 | 7/1980 | Joyce et al. | 364/900 |

OTHER PUBLICATIONS

Agrawala and Rauscher, Microprogramming: Perspective and Status, IEEE Transactions on Computers, vol. C-23, No. 8, Aug. 1978, pp. 817–837.

Primary Examiner—Daniel K. Dorsey
Attorney, Agent, or Firm—Robert W. Berray

[57] ABSTRACT

A binary number substitution mechanism includes first and second storage arrays addressed by first and second portions, respectively, of an input binary number, producing a substitute output binary number. The input binary number represents a predetermined number of microinstruction addresses in a read-only store, and the output binary number is representative of microinstruction addresses in a main storage device. Only a limited number of the possible input binary numbers are required to access the first and second storage arrays to read out selectively stored binary numbers to create a limited range of output binary numbers unique to each of the limited number of the input binary numbers.

3 Claims, 5 Drawing Figures

BINARY NUMBER SUBSTITUTION MECHANISM IN A CONTROL STORE ELEMENT

This is a continuation, of application Ser. No. 269,146 filed June 1, 1981 now abandoned.

BACKGROUND OF THE INVENTION

1. Field of the Invention

The present invention relates to binary number conversion and more particularly to providing a unique substitute binary number, from a limited range of numbers, for each of selectable ones of input binary numbers having a relatively large range.

2. Related Patent Applications

The following applications, including this application, assigned to the assignee of this application, have been filed on even date herewith:

1. U.S. Pat. No. 4,422,144 entitled "Microinstruction Substitution Mechanism In A Control Store Element", invented by L. H. Johnson et al.

2. Ser. No. 269,147 entitled "An Improved Binary Number Substitution Mechanism" invented by F. T. Blount; and 3. Ser. No. 269,148 now abandoned entitled "Microcode Control of Microinstruction Substitution In A Control Store Mechanism" invented by E. A. Nadarzynski et al.

3. Patents Incorporated by Reference

The following U.S. patents, all assigned to the assignee of the present invention, disclose various elements of a control store mechanism utilizing the present invention, and are herewith incorporated by reference:

1. U.S. Pat. No. 3,800,293 issued Mar. 26, 1974, entitled "Microprogram Control Sub-System" by T. A. Enger et al.

2. U.S. Pat. No. 3,958,227 issued May 18, 1976, entitled "Control Store System With Flexible Control Word Selection" by C. W. Evans.

3. U.S. Pat. No. 3,976,865 issued Aug. 24, 1976, entitled "Error Detector For An Associative Directory Or Translator" by T. A. Enger.

4. U.S. Pat. No. 4,008,460 issued Feb. 15, 1977, entitled "Circuit For Implementing A Modified LRU Replacement Algorithm For A Cache" by L. R. Bryant et al.

4. Prior Art

In stored program data processing systems, two techniques for control of the data processing system are normally implemented. One involves the design of hardwired sequencers, and the other involves the design of a control store element (CSE) comprised of storage devices for storing sequences of micro-instructions making up microprograms. In either case, machine instructions transferred from main storage to the central processing unit will be interpreted to determine the coding of an operation code portion of the instruction to determine the function to be performed such as Add, Subtract, Multiply, etc. When a CSE is utilized, the operation code will normally be utilized to address a storage device to access the first micro-instruction of a microprogram effective to execute the function called for by the operation code.

An excellent discussion of the various forms that a CSE can take is found in an article entitled "Micropro-gramming: Perspective and Status" by A. J. Agrawala and T. G. Rauscher, IEEE Transactions On Computers, Volume C-23, No. 8, August 1974, Page 817. One form of CSE includes at least two types of storage devices utilized for storing sequences of microinstructions making up microprograms. One type of storage device is a read-only store (ROS), and the other is a writeable control store (WCS). The ROS will be comprised of binary bit patterns which make up addressable microinstructions and which, during operation of the data processing system, will never be altered. In some data processing systems, the ROS may in fact be a permanently configured storage device created during manufacture of the data processing system. Another form of ROS would be a volatile storage device in which information can be stored, as necessary, but once initialized or loaded with microinstructions, will thereafter not be modified during processing functions. On the other hand, a WCS will be an addressable storage device of the read-write type wherein microinstructions can be dynamically stored into the storage device and thereafter read or accessed for use, and would be dynamically changed as conditions required during data processing. Examples of this type of CSE configuration are represented by U.S. Pat. Nos. 3,478,322 and 3,735,363.

Contempory data processing systems which include a CSE, also include a central processing unit and a main storage device for the storage of data and programs to be executed by the system. Also included is a processor controller, or console, which provides basic control for the entire system. It is the function of the processor controller, when power is turned on to the data processing system, to load necessary information into the data processing system.

The main storage device has a portion reserved for a number of system control data blocks, including all of the microprograms required to operate the system. This reserved portion of main storage is not addressable by program instructions executed by the system, but is primarily addressable by the central processing unit under control of microinstructions. To initialize the data processor, the processor controller will transfer all of the microcode, and other control information required by the system, to the reserved portion of main storage. By utilizing special data paths, the processor controller has the ability to store prespecified information into various registers, triggers, or storage arrays within the central processing unit, including the ROS of the CSE, if the ROS is a read-write type of storage device. If the ROS is a permanent storage device this would not be required. When a WCS is provided, this may be initialized by the processor controller or, as a minimum, the processor controller will store all of the microcode that may be utilized in the WCS into the main storage device.

The use of ROS in a CSE is normally for frequently used microcode. Its construction is such that it is very dense and high speed, but is relatively expensive when compared with a WCS. As the design of a data processing system progresses, a point will be reached where all of the microprograms have been written for the frequent processing functions required. A ROS storage device will be manufactured with the permanent bit patterns required to provide the necessary sequence of microinstructions. It is frequently discovered during the data processing system design, or after design has been completed, that certain of the previously created microinstructions in the ROS are erroneous. Another error situation that can occur with the ROS, even after the entire data processing system has been designed and erroneous microinstructions corrected, is that the hardware mechanism of the ROS may develop a failure which is permanent. Also, the creation of microcode that is permanently stored in a ROS is initially dictated by known features, functions and instructions to be executed when the data processing system is designed. New features, changing functions, or newly defined program instructions requiring modifications to the bit patterns of a ROS would require a long and expensive procedure, and systems already in use could not be modified easily.

The above-cited Related Application 1 describes a microinstruction substitution mechanism where substitute microinstructions are transferred from main storage to a WCS from a main storage address which is a function of the address of a faulty microinstruction read from ROS.

SUMMARY OF THE INVENTION

A primary object of the present invention is to provide a binary number substitution mechanism which creates a substitute main storage address for the address of a faulty microinstruction in a ROS, which main store address is one of a relatively small range of addresses set aside in main storage for substitute microinstructions required for a relatively large number of microinstructions stored in a ROS that could possibly be faulty.

The present invention is utilized in a contemporary data processing system that includes a main storage device, central processing unit, processor controller, and control storage element (CSE). The CSE includes, for the storage of microinstructions, a read-only store (ROS) and a writeable control store (WCS). The ROS contains a predetermined number of addressable microinstructions. The WCS functions essentially like a high-speed buffer, or cache, found between the main store and the CPU of many data processing systems. That is, the WCS contains a small number of microinstructions of all of the microinstructions which can be stored in the area reserved in the main store for microcode. The WCS is a fully associative storage device which includes an address directory for identifying and locating microinstructions in the WCS by using the main store address utilized for accessing the main store for the transfer of a group of microinstructions to the WCS. Since the WCS has a limited capacity, a least recently used (LRU) replacement algorithm is implemented. As new microinstructions are transferred from main store to the WCS, the replacement algorithm identifies the portion of the WCS to be replaced by the new group of microinstructions. The WCS functions in accordance with the teachings of the above-identified references 3 and 4. The dynamic, as-needed, transfer of groups of microinstructions from main storage to the WCS is similar to data transfer between I/O devices and main storage, and is called "paging". Therefore, the use of the WCS in this fashion prompts a re-naming to pageable control store (PCS).

More particularly, the present invention is utilized with the invention described in Related Application 1 which discloses a storage device known as a halt array and an address substitution mechanism comprised of two storage arrays, which is the subject of the present invention. The halt array includes a single bit position associated with each microinstruction that can be addressed in the ROS. As errors are noted in the operation of particular microinstructions read from ROS, maintenance personnel will provide necessary information in the processor controller to cause the associated bit position of the halt array to be changed to a binary 1. The halt array is accessed with the same microinstruction address utilized to access the ROS. When the corresponding bit position is read out and detected as a binary 1, the execution of the faulty microinstruction is prevented.

In response to the halt signal from the halt array, the address of the faulty microinstruction in ROS is utilized in the address substitution mechanism of the present invention which provides a substitute address to address the location in main storage of the microinstruction to be substituted for the faulty microinstruction.

In accordance with the present invention, easy implementation and updating of an address substitution mechanism is achieved by providing two readily available storage arrays comprised of 256 addressable locations each comprised of eight binary bits. The two storage arrays are each respectively addressed by first and second portions of an input binary number representing a ROS microinstruction address. Only those ROS addresses identifying faulty microinstructions as indicated by the halt array, require a substitute address. As faulty ROS microinstructions are determined by maintenance personnel, a suitable main store address is determined and first and second portions of that address are stored in the first and second storage arrays at locations addressed by the input binary number. The addressed locations of the two storage arrays provide outputs which are combined to create the required main store address utilized with the addressing mechanism of the pageable control store.

The invention is defined with particularity in the appended claims. The above and further objects and advantages of this invention may be better understood by referring to the following detailed description taken in conjunction with the accompanying drawings.

DETAILED DESCRIPTION OF INVENTION

Figure 1:
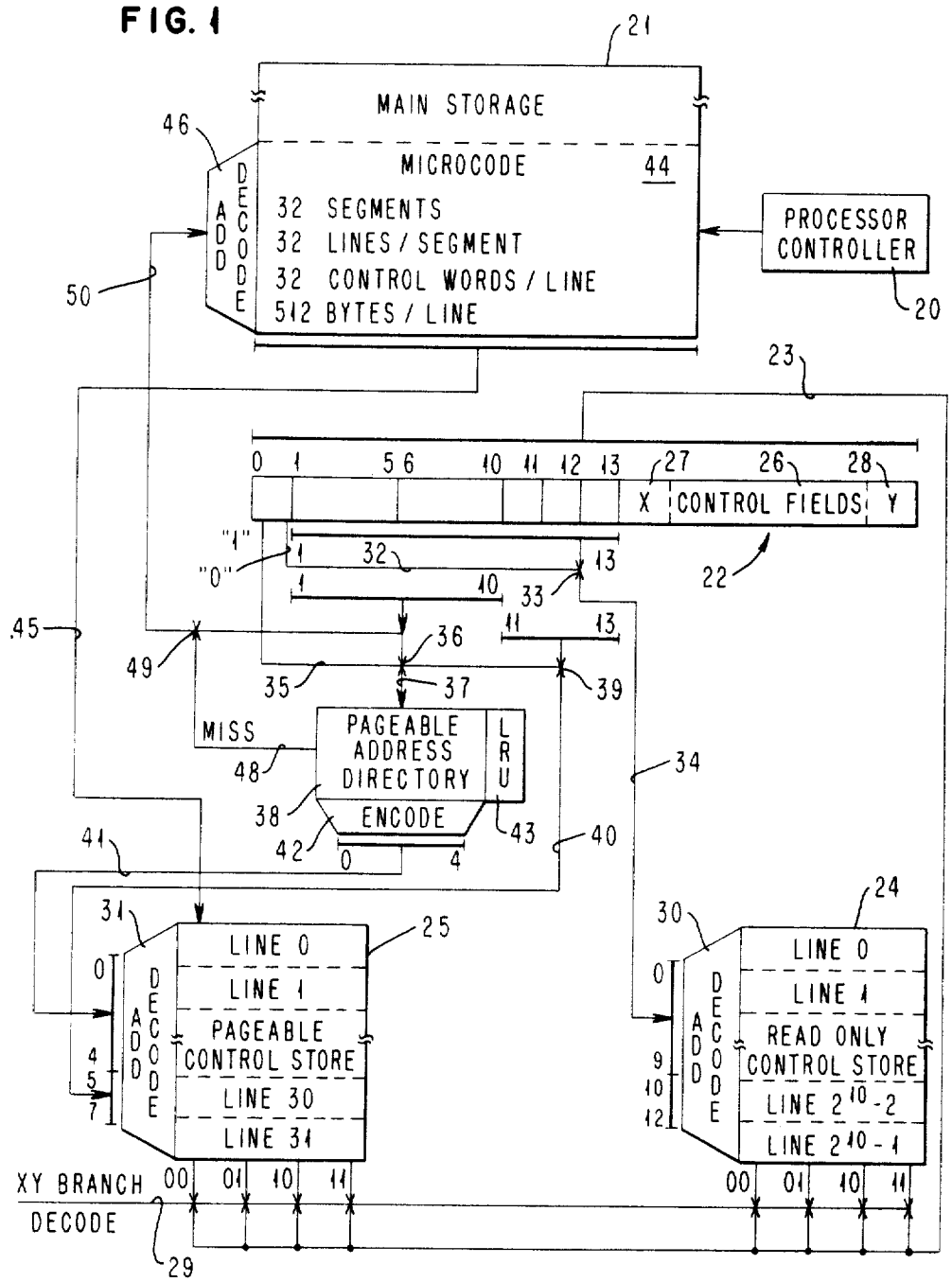
FIG. 1 is a block diagram showing the major components of a control store element (CSE).

FIG. 1 is a block diagram showing the relationship of a Processor Controller 20, Main Storage 21, and a Control Store Element (CSE) of a contemporary data processing system. Only that portion of a CSE required to understand the present invention is shown. The CSE includes a Control Store Data Register (CSDR) 22 which stores, for each cycle, a microinstruction received on line 23 from either a Read-Only control Store (ROS) 24 or a Pageable Control Store (PCS) 25.

Each microinstruction stored in CSDR 22 includes a number of control fields 26, the decoding of which control the data flow, logic, and arithmetic of a data processing system. In many contemporary data processing systems utilizing a CSE, each microinstruction also includes the information necessary to address the next microinstruction in sequence. The address of the next microinstruction, often referred to in the literature as the next address (NA), includes CSDR 22 bit positions 0 through 13. To provide branching capability in a microinstruction sequence, each microinstruction also includes an X-branch control field 27 and a Y-branch control field 28. The branch control fields 27 and 28 are coded to select a particular data processing machine condition to provide coded information for accomplishing a microprogram branch. The use of the branching capability will be discussed subsequently. An understanding of this capability is completely defined in the above cited Reference 2. The results of the branching capability are effective on a line 29 in FIG. 1 to select one of four possible microinstructions addressed and accessed from either the ROS 24 or PCS 25 to transfer the selected microinstruction on line 23 to the CSDR 22.

A microprogrammer who is creating the sequence of microinstructions for the data processing system will have the ability to code each microinstruction in the CSDR 22 to cause address and accessing of microinstructions from either the ROS 24 or PCS 25. This selection is made by the state of NA bit position 0. A binary "0" will cause the remainder of the NA bit positions to be effective at Address Decode 30 to effect access and readout of ROS 24. A binary "1" in NA bit position 0 will cause Address Decode 31 associated with PCS 25 to be effective.

When NA bit position 0 is a binary "0", as signalled on line 32, the gate 33 will be effective to transfer NA bits 1 through 13 on lines 34 to the address decode 30 of ROS 24. When NA bit 0 is a binary "1", as signalled on line 35, a gate 36 will be enabled to transfer NA bits 1 through 10 on a line 37 to a Pageable Address Directory 38, the function of which will be subsequently described. The signal on line 35 will also enable a gate 39 to transfer NA bits 11 through 13 on line 40 to be part of the address utilized in Address Decode 31 of PCS 25. The remainder of the address utilized in the address decode 31 of PCS 25 is transferred on line 41 from an Encode mechanism 42 associated with the Pageable Address Directory 38.

The proper operation of the Pageable Address Directory 38 requires a replacement algorithm which is provided by an LRU mechanism 43. The function of the Pageable Address Directory 38, Encode mechanism 42, and LRU mechanism 43 are thoroughly described in the above cited References 3 and 4.

As indicated earlier, an area 44 is reserved in Main Storage 21 for the microcode which is to be transferred to the PCS 25 as required. The reserved area 44 is loaded with microcode from the Processor Controller 20. Each time a quantity of microcode is to be transferred from Main Storage 21 to PCS 25 on line 45, Main Storage 21 will be addressed by an Address Decode mechanism 46 to cycle and transfer 512 consecutive 8-bit bytes on line 45 to PCS 25. The 512 bytes are configured to provide 32 microinstructions. These 32 microinstructions are identified as a "line" of microcode.

In accordance with the manner in which the NA bits 1 through 13 are configured, NA bits 11, 12 and 13, along with the final 2 bits provided by the XY branching capability, identify a particular microinstruction within a line of 32 microinstructions. The remainder of the NA bits are configured to provide identification of segments and lines within segments. That is, NA bits 1 through 5 are capable of identifying 32 segments of microcode and NA bits 6 through 10 are capable of identifying 32 lines within a particular segment of microcode. This addressing capability of NA bits 1 through 13 and the XY branch bits provides an addressing capability of 32K (K=1,024) microinstructions that could be stored in the reserved area 44. A preferred embodiment for the present invention utilizes less than this capability. In particular, the ROS 24 has been designed to permanently store 8K microinstructions. Therefore, whereas the Address Decode mechanism 30 is shown to be receiving 13 NA bits, only NA bits 3 through 13, along with the XY branch selection, are required to provide access to one of the 8K microinstructions.

As shown in FIG. 1, the PCS 25 is configured to include 32 lines of microcode totaling 1K microinstructions. In accordance with the teaching of the above-cited References 3 and 4, each NA specifying a pageable main store address, indicated on line 35, will initiate an associative search in the Pageable Address Directory 38 to determine which line of PCS 25 contains the microcode line being addressed. If the line requested is stored in PCS 25, an associated one of the registers in the Pageable Address Directory 38, indicates the match and its identity will be encoded by Encode mechanism 42 to provide the five address bits required on line 41 to select the proper line in PCS 25. The remainder of the NA bits 11 through 13 will be transferred on line 40 to the Address Decode mechanism 31 to select a branch-group of four microinstructions from the line. The particular one of the microinstructions in the branch-group to be transferred on line 23 to CSDR 22 is selected by the XY Branch Decode 29.

If the line of pageable microcode identified by NA bits 1 through 10 do not find a match in the Pageable Address Directory 38, a signal on line 48 indicating a Miss will be effective at a gate 49 to transfer the NA bits 1 through 10 on line 50 to the Address Decode mechanism 46 to initiate transfer of the 512 bytes comprising the line of microcode required on line 45 to PCS 25. The LRU mechanism 43, in accordance with the teaching of Reference 4, will select the line of PCS 25 least-recently used to receive and store the line of microcode. The line of PCS 25 selected by the LRU mechanism 43 will cause the next address bits 1 through 10 to be stored in the associated register of the Pageable Address Directory 38.

Figure 2:
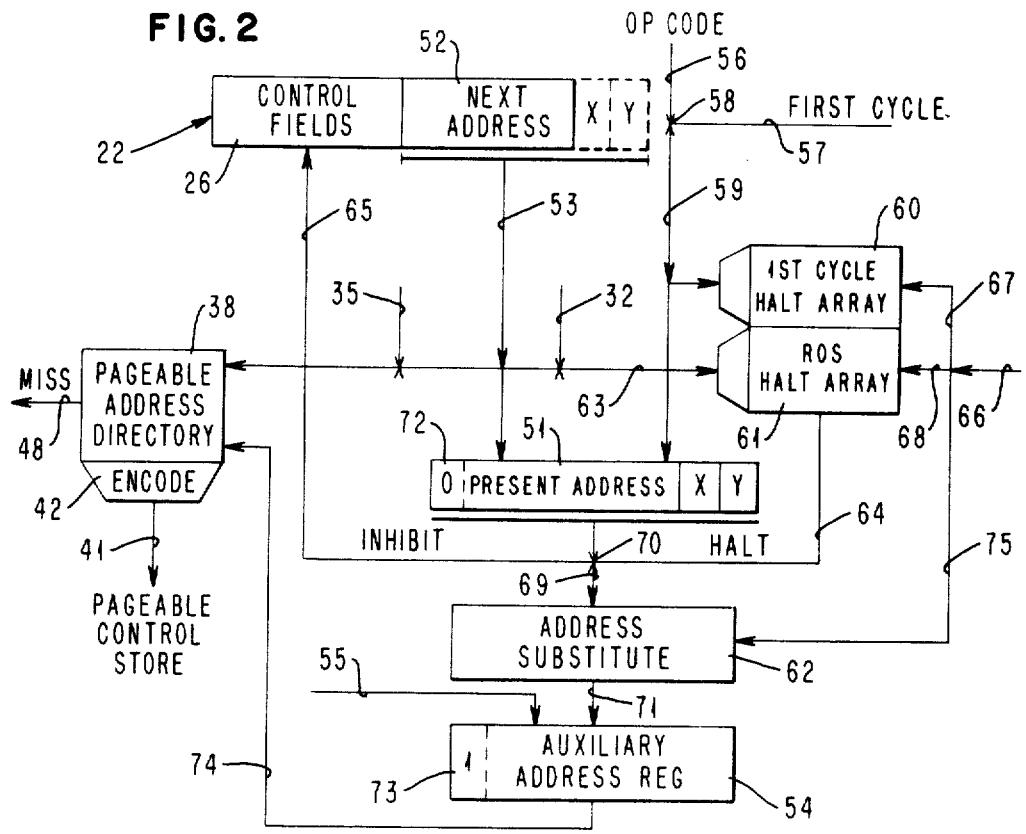
FIG. 2 is a block diagram showing the addition of the present invention, and its relationship, to certain portions of FIG. 1.

FIG. 2 is a block diagram that includes certain portions of the apparatus disclosed in FIG. 1. The same numeric designation has been utilized. Additional structure of a CSE in a contemporary data processing system is included in FIG. 2. A Present Address Register 51 stores the complete address, including the XY branch bits, utilized to access a microinstruction for transfer to the CSDR 22. When the Next Address portion 52 of each microinstruction is transferred to the address decoding mechanism 30 or 31 shown in FIG. 1, it is transferred on line 53 to the Present Address Register 51. The Present Address Register 51 therefore retains the address of each microinstruction transferred to, and stored in, CSDR 22 during the cycle that the control fields 26 are effective. Another register shown in FIG. 2 is an Auxiliary Address Register 54 which is utilized in the contemporary data processing system to receive, on a line 55, control store address information from a number of other sources during the sequencing of the CSE.

Also added to the description of FIG. 2 is an additional input to the CSE in accordance with the above cited Reference 1 which discloses the concept of a first cycle control store in the CSE. That is, on the first cycle of any machine instruction execution, the operation code of the machine instruction is utilized to access a control store element utilized only for the first cycle of machine instruction execution. FIG. 2 shows a line 56 which receives the OP CODE portion of the machine instruction. When a signal on a line 57 indicates a first cycle of machine instruction execution, the gate 58 will be enabled to transfer the OP CODE bits on line 59 to the Present Address Register 51. Therefore, the Present Address Register 51 will store a representation of the OP CODE on line 56 during the cycle that the microinstruction accessed on the first cycle is stored in the CSDR 22.

As indicated previously, there are a number of situations in which there is a desire to change the normal sequencing of previously written microcode stored in the ROS 24 of FIG. 1. These situations could include the detection of a permanent error in a microinstruction, a particular microinstruction may be proper but other hardware of the data processing system may cause an error condition which must be rectified, the microinstruction accessed from the first cycle control store may be faulty, or the data processing system may be required to respond to an OP CODE of a machine instruction which it was not originally designed to execute. In all of these situations, it is the primary object of the present invention to inhibit the normal functioning of a microinstruction transferred to CSDR 22 and substitute a microinstruction to be accessed from the PCS 25 of FIG. 1.

The apparatus of the subject invention to achieve the above cited result includes a First Cycle Halt Array 60, a ROS Halt Array 61, and an Address Substitute mechanism 62. Each of the arrays 60 and 61 has a single bit storage position for each microinstruction that can conceivably create an error condition. If the OP CODE received on line 56 has eight bit positions, as is standard, the First Cycle Halt Array 60 will have 256 bit storage positions. In accordance with the preferred embodiment of the present invention, the ROS 24 will store 8K microinstructions, and therefore the ROS Halt Array 61 will be comprised of 8K bit storage positions.

When either the First Cycle Halt Array 60 or the ROS Halt Array 61 is accessed, either by the OP CODE on line 59, or the Next Address portion 52 on line 63, gated by the signal line 32 indicating a ROS 24 address, a binary "1" in the accessed bit storage position will provide a Halt signal on line 64 indicating an error situation, and will be effective on a line 65 to inhibit the operation of the control fields 26 of the microinstruction accessed from either the first cycle control store or the ROS 24 of FIG. 1.

The Processor Controller 20 of FIG. 1 is utilized during the initialization of the data processing system to provide the proper pattern of binary "1" and binary "0" for the First Cycle Halt Array 60 or the ROS Halt Array 61. This information is created by maintenance personnel, and during the initialization process, will be input to the arrays on lines 66, 67 and 68. As the need for changes to microinstruction execution are noted, the proper bit patterns will be created by maintenance personnel for storage in the halt arrays at the address associated with the microinstruction to be inhibited.

When a halt is indicated on signal line 64, the address stored in the Present Address Register 51 of the microinstruction for which a substitute microinstruction is to be accessed, is transferred on a line 69 through a gate 70 to the Address Substitute mechanism 62. The Address Substitute mechanism 62 will then effect a translation of the address stored in the Present Address Register 51 to a main storage address for transfer on line 71 to the Auxiliary Address Register 54. As part of the address translation process, bit position 0 of the Present Address Register 51, shown as a binary "0" at 72, will be translated to a binary "1" shown at 73 in the Auxiliary Address Register 54. Thereafter, the address stored in Auxiliary Address Register 54, which is a main storage address, will be transferred on line 74 to the Pageable Address Directory 38 to initiate a normal PCS 25 access function as described in connection with FIG. 1.

The Processor Controller 20 of FIG. 1 is utilized to input information on lines 66 and 75 to provide, during the initialization process, the address in Main Storage 21 of FIG. 1 of the microinstruction to be substituted for the erroneous microinstruction. The main storage address on line 75, to be associated with the erroneous microinstruction address in Present Address Register 51, will be stored in the Address Substitute mechanism 62 to thereafter be generated on line 71 whenever the erroneous microinstruction address is utilized.

Figure 3:
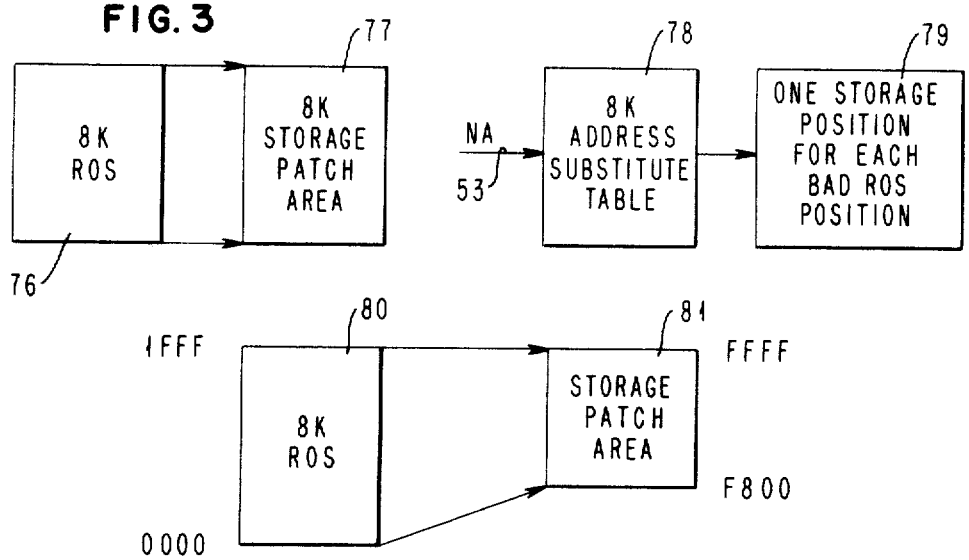
FIG. 3 is a representation of the main storage address compression achieved utilizing the address substitution of the present invention.

FIG. 3 shows a number of alternative methods by which main storage addresses for the substitute microinstruction can be created for entry into the Address Substitute mechanism 62 of FIG. 2. One technique would require each of the 8K ROS addresses 76 to be provided with an associated main storage address 77 creating an 8K storage patch area 77. With this arrangement, the only requirement for the Address Substitute mechanism 62 of FIG. 2 is to convert the address position 72 in the Present Address Register 51 from a binary "0" to a binary "1" in the Auxiliary Address Register 54. This alternative creates a very simple Address Substitute mechanism 62, but is very wasteful of main storage address space in that 8K main storage microinstruction addresses must be permanently reserved.

Another alternative is shown in FIG. 3 where the next address (NA) bits 53 are utilized to address an 8K Address Substitute Table 78. That is, each possible 8K ROS address will have an addressable entry in the Address Substitute Table 78 only if the particular address provides access to an erroneous microinstruction. Therefore, the Address Substitute mechanism 62 of FIG. 2 would not only detect an erroneous microinstruction, but provides the ability to reserve only one main storage position for each bad ROS position as indicated at 79. Therefore, with the inclusion of a comparatively expensive Address Substitute Table 78, a great deal of compression can be realized in Main Storage 21 with very little space set aside for substitute microinstructions.

Figure 5:
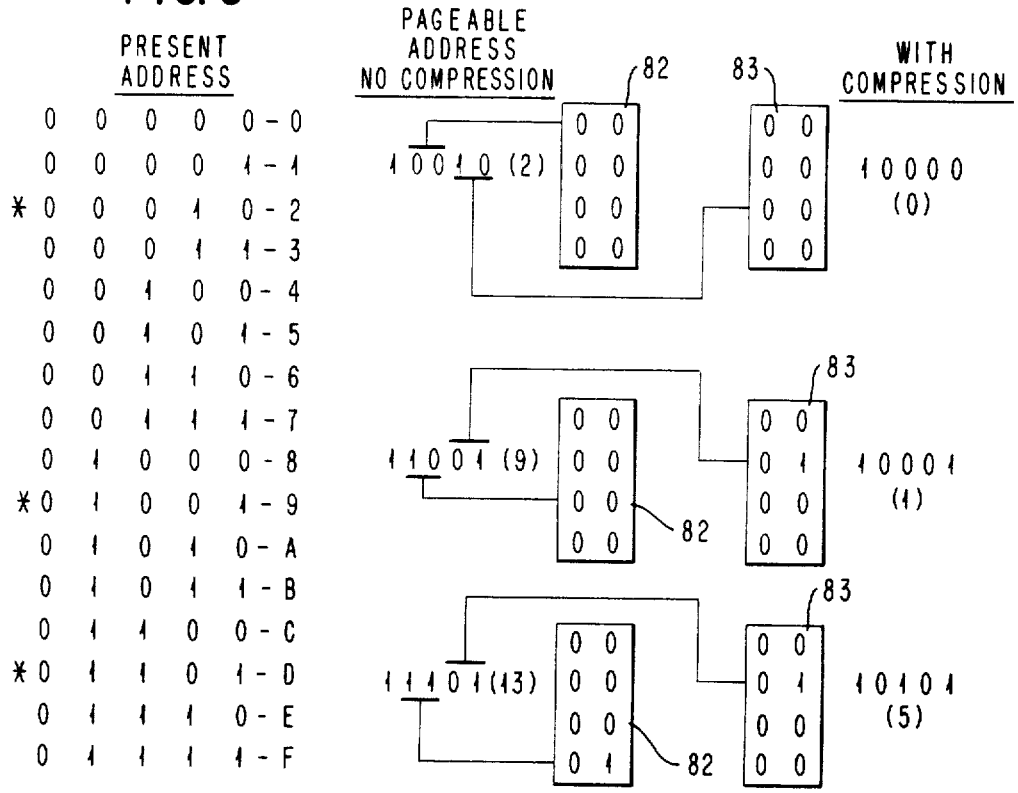
FIG. 5 is a representation explaining the theory for achieving compression of main store addresses resulting from an address substitution mechanism of the present invention.

A preferred result for the Address Substitute mechanism 62 of FIG. 2 will be described subsequently, and is represented in FIG. 3 at 80 and 81. An 8K ROS address space 80 can be compressed to a Storage Patch Area 81 which is a compromise between the amount of main storage addresses that must be reserved for substitute microinstructions, and the expense and efficiency of the address translation performed by the Address Substitute mechanism 62 of FIG. 2. As represented, the 8K ROS addresses 80 range from 0000 to 1FFF (each position representing a hexadecimal digit comprised of four binary bits), to a Storage Patch Area 81 which ranges from main storage addresses F800 through FFFF, a total of 2K microinstruction addresses. Hexadecimal notation is fairly common, but the particular representation of four binary bits representing a hexadecimal digit is shown in FIG. 5.

Figure 4:
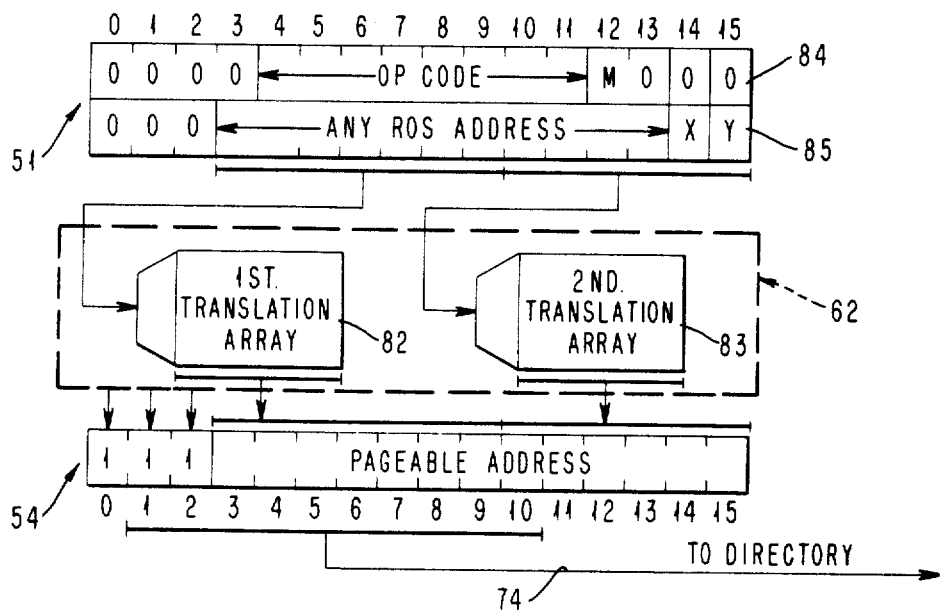
FIG. 4 a block diagram of the address substitution mechanism of the present invention.

FIG. 4 depicts the Address Substitute mechanism 62, of the present invention, between the Present Address Register 51 and the Auxiliary Address Register 54 shown in FIG. 2. The Address Substitute mechanism 62 is comprised of a First Translation Array 82 and a Second Translation Array 83. The format of an address to be translated may include a first cycle format shown at 84 or any other ROS address shown at 85. The address of a first cycle microinstruction includes an 8-bit OP CODE in bit positions 4 through 11. Also shown at 84 is a Mode bit in position 12 which may signify the presence of an OP CODE in a data processing system having, for example, two different instruction sets. The remainder of the bit positions shown at 84 will be a binary "0". At 85, only bit positions 3 through 15 are needed to signify a ROS address range from 0 through 8K. Bit positions 0 through 2 will be a binary "0" in all cases, and signify a ROS address.

A translated address is to be inserted in the Auxiliary Address Register 54 from the First and Second Translation Arrays 82 and 83. Bit positions 0 through 2 comprise a prefix value which, in register 51, signify a ROS address and which will be altered to binary "1" to signify a main storage pageable address to be utilized in the PCS 25 access mechanism of FIG. 1.

The desirable feature of providing compression of main storage addresses is achieved by providing a First Translation Array 82 and a Second Translation Array 83. The two arrays are each addressed utilizing first and second portions of the address information in the Present Address Register 51. That is, First Translation Array 82 is addressed by bit positions 3 through 9, and the Second Translation Array 83 is addressed by bit positions 10 through 15. The addressed positions in each of the arrays 82 and 83 will have been provided with proper main storage addresses as determined by maintenance personnel and received from the Processor Controller 20. The output of the First Translation Array 82 will provide a substitute address in bit positions 3 through 9, and the Second Translation Array 83 will provide substitute address information in bit positions 10 through 15. The substitute address provided to the Auxiliary Address Register 54 will then be transferred on line 74 to access the Pageable Address Directory 38 shown in FIG. 2.

FIG. 5 will be utilized to explain the theory behind the information to be stored into the First Translation Array 82 and Second Translation Array 83 of FIG. 4, as determined by maintenance personnel when erroneous operation is recognized at particular ROS addresses. At the left of FIG. 5 under the heading "Present Address" is shown an example of sixteen ROS addresses ranging from 0 through F in hexadecimal notation. The designation of a ROS address is shown by the leftmost binary bit position, all of which are a binary "0". Erroneous microinstruction operation at addresses "2", "9" and "D" are indicated by an asterisk. Under the heading "Pageable Address, No Compression" the address translation technique whereby only the highest order binary bit position is changed, (from binary "0" to binary "1") shows that sixteen main storage addresses must be set aside for substitute microinstructions. At the right of FIG. 5, under the heading "With Compression", the use of a First Translation Array 82 and Second Translation Array 83 is shown to provide a compression of the number of main storage addresses that must be set aside for substitute microinstructions.

As represented in FIG. 5, the First Translation Array 82 will be addressed by the first two bits of the present address, and the Second Translation Array 83 will be addressed by the second two bits.

The error condition indicated at address number "2", causes the translation arrays 82 and 83 to be addressed as shown, and provide a translated address output of hexadecimal "0". A second erroneous address is noted at address "9". The first and second arrays 82 and 83 will be provided with translated addresses by the maintenance personnel to provide an output of hexadecimal "1".

When a third erroneous microinstruction at address "D" is recognized, the translated address information provided by the maintenance personnel must provide an output that will distinguish from the output provided when the translation arrays 82 and 83 are accessed by the erroneous address "9". The first translation array 82 is provided with the required information to create a unique translated address. This is accomplished by changing the location in the first translation array 82 addressed by the first two address bits to provide an output of "01". Thereafter, the translated address provided by the translation arrays 82 and 83 will result in a pageable address of hexadecimal "5" for the erroneous ROS address "D".

The Address Substitute mechanism 62 as implemented in accordance with FIG. 4 has achieved unique translation and compression of main storage address requirements in an efficient and inexpensive manner. This was through a recognition that only a sub-set of 8K possible addresses would require a substitute microinstruction. A substantial reduction in size and cost of the translation arrays 82 and 83 over an 8K translation table providing sixteen bit outputs is readily apparent. Each of the arrays 82 and 83 can be readily available and inexpensive 256×8 memory chips, providing sufficient translation capabilities for the number of microinstructions actually needing substitution.

While the invention has been particularly shown and described with references to a plural embodiment thereof, it will be understood by those skilled in the art that the foregoing and other changes in form and details may be made therein without departing from the spirit and scope of the invention.

I claim:

1. A binary number substitution mechanism comprising:

first and second storage arrays comprised of $2^n$ n-bit storage locations and $2^p$ p-bit storage locations respectively, said first and second storage arrays each including access means for simultaneously addressing one of the $2^n$ storage locations of said first storage array and one of the $2^p$ storage locations of said second storage array, and a total of n+p read-out signal lines for data stored in the storage locations of said first and second storage arrays;

m input binary signal lines, said m input binary signal lines including an n-bit portion and a p-bit portion, the binary state of said m input binary signal lines being effective to represent $2^m$ binary numbers;

gate means, selectively and simultaneously interconnecting said n-bit portion of said m input binary signal lines to said access means of said first storage array and said p-bit portion of said input binary signal lines to said access means of said second storage array; and enabling means having an output signal connected to said gate means, and connected to said m input binary signal lines and responsive to certain ones of said binary number representations of said m input binary signal lines, for enabling said gate means whereby a substitute binary number manifestation is read out of said first and second storage arrays on said n+p read-out signal lines.

2. A binary number substitution mechanism in accordance with claim 1 wherein:

the binary data stored in a particular one of said storage locations of one of said first or second storage arrays is caused to be different from the binary data stored in other of said storage locations of the same one of said first or second storage arrays when the number represented by said read-out signal lines would otherwise not be unique for two binary number representations of said m input binary signal lines.

3. A binary number substitution mechanism in accordance with claims 1, or 2 wherein said enabling means includes:

a third addressable storage array, connected to said m input binary signal lines, comprised of $2^m$ binary bit storage positions for storing a binary "0" or "1", each said bit storage position responsive to a particular binary number representation of said m input binary signal lines for generating said output signal when storing a particular one of said binary states.

* * * * *